US012000659B2

United States Patent
Ishmael et al.

(10) Patent No.: US 12,000,659 B2
(45) Date of Patent: Jun. 4, 2024

(54) HEAT EXCHANGE SYSTEM FOR FREEZING A PHASE CHANGE MATERIAL AND METHODS THEREOF

(71) Applicant: Active Energy Systems, Knoxville, TN (US)

(72) Inventors: Mitchell Ishmael, Knoxville, TN (US); Levon Atoyan, Knoxville, TN (US); Grady J. Iliff, Knoxville, TN (US)

(73) Assignee: Active Energy Systems, Knoxville, TN (US)

( * ) Notice: Subject to any disclaimer, the term of this patent is extended or adjusted under 35 U.S.C. 154(b) by 259 days.

(21) Appl. No.: 17/045,445

(22) PCT Filed: Apr. 4, 2019

(86) PCT No.: PCT/US2019/025841
§ 371 (c)(1),
(2) Date: Oct. 5, 2020

(87) PCT Pub. No.: WO2019/195581
PCT Pub. Date: Oct. 10, 2019

(65) Prior Publication Data
US 2021/0041183 A1    Feb. 11, 2021

Related U.S. Application Data

(60) Provisional application No. 62/652,544, filed on Apr. 4, 2018.

(51) Int. Cl.
*F28D 20/02*   (2006.01)
*F28F 21/06*   (2006.01)

(52) U.S. Cl.
CPC .......... *F28D 20/021* (2013.01); *F28F 21/067* (2013.01); *F28F 2245/00* (2013.01)

(58) Field of Classification Search
CPC ...... F28F 17/00; F28F 2245/00; F28F 21/067; F28D 20/021
See application file for complete search history.

(56) References Cited

U.S. PATENT DOCUMENTS 2,996,894 A * 8/1961 Shade ..................... F25D 16/00
62/99
4,153,105 A * 5/1979 Schroder ................. F25B 13/00
165/902

(Continued)

FOREIGN PATENT DOCUMENTS

CN    200968799 Y    10/2007
JP    S63263367 A    10/1988

(Continued)

OTHER PUBLICATIONS

Extended European Search Report issued in corresponding European Application No. 19781353.8; dated Feb. 11, 2022 (9 pages).

(Continued)

*Primary Examiner* — Devon Russell
(74) *Attorney, Agent, or Firm* — Osha Bergman Watanabe & Burton LLP

(57) ABSTRACT

A heat exchange system including a tank, a phase change material (PCM) held in the tank, an immiscible liquid layer held in the tank, a heat exchanger located within the immiscible liquid layer, and a distributor located above the heat exchanger. The immiscible liquid layer has a density lower than a density of the PCM and is located above the PCM. The distributor is configured to introduce a plurality of PCM droplets into the immiscible liquid layer and above the heat exchanger.

17 Claims, 7 Drawing Sheets

(56) References Cited

U.S. PATENT DOCUMENTS

| | | | | |
|---|---|---|---|---|
| 4,254,635 | A | * | 3/1981 | Simon ............. F25D 16/00 165/104.11 |
| 5,481,882 | A | * | 1/1996 | Watanabe ......... F28D 20/025 62/70 |
| 5,572,883 | A | * | 11/1996 | Roberts ............ F25D 16/00 165/110 |
| 8,720,211 | B2 | | 5/2014 | Folger |
| 8,931,277 | B2 | | 1/2015 | Peterson et al. |
| 9,683,197 | B2 | | 6/2017 | Aizenberg et al. |
| 10,415,864 | B2 | | 9/2019 | Choi |
| 2012/0276335 | A1 | | 11/2012 | Hong et al. |
| 2014/0342954 | A1 | | 11/2014 | Ingber et al. |
| 2015/0204612 | A1 | | 7/2015 | Sun et al. |
| 2015/0209198 | A1 | | 7/2015 | Aizenberg et al. |
| 2016/0123680 | A1 | | 5/2016 | Lee et al. |
| 2016/0174418 | A1 | * | 6/2016 | He ............ H05K 7/20827 165/250 |
| 2016/0273819 | A1 | | 9/2016 | Choi |
| 2018/0298203 | A1 | | 10/2018 | Aizenberg et al. |
| 2019/0101315 | A1 | | 4/2019 | Goldfarbmuren et al. |
| 2020/0299520 | A1 | | 9/2020 | Lynn et al. |

FOREIGN PATENT DOCUMENTS

| | | | |
|---|---|---|---|
| JP | H2110231 | A | 4/1990 |
| JP | H0439380 | A | 2/1992 |
| JP | H0566031 | A | 3/1993 |
| JP | H0719688 | A * | 6/1993 |
| JP | H07019688 | A | 1/1995 |
| JP | H07043055 | A | 2/1995 |
| JP | 5872037 | B2 * | 3/2016 |
| JP | 5872037 | B2 | 3/2016 |
| WO | 2010078701 | A1 | 7/2010 |
| WO | 2010093400 | A1 | 8/2010 |
| WO | 2016035105 | A1 | 3/2016 |

OTHER PUBLICATIONS

Tak-Sing Wong et al.; "Supplementary Information for Bioinspired self-repairing slippery surfaces with pressure-stable omniphobicity", Nature, vol. 477, Sep. 2011 (5 pages).
M. Kauffeld et al.; "Ice slurry—History, current technologies and future developments", International Journal of Refrigeration, 99, 2019, pp. 264-271 (8 pages).
K. Matsumoto et al.; "Ice storage system with water-oil mixture formation of suspension with high IPF", International Journal of Refrigeration, 23, 2000, pp. 336-344 (9 pages).
M. Safarik et al.; "Power-to-Cold using vacuum ice slurry technology in the scope of German WindNODE project", Institute of Air-handling and Refrigeration (ILK Dresden), 2018 (17 pages).
K. Itagaki; "Adhesion of Ice to Polymers and Other Surfaces", U.S. Army Cold Research and Engineering Laboratory, Physicochemical Aspects of Polymer Surfaces, 1983 (12 pages).
J. Chen et al.; "Anti-Ice Coating Inspired by Ice Skating", Small 2014, 10, No. 22, pp. 4693-4699 (7 pages).
S. Jung et al.; "Are Superhydrophobic Surfaces Best for Icephobicity? ", ACS Publications, American Chemical Society, Langmuir 2011, 27, pp. 3059-3066 (8 pages).
Tak-Sing Wong et al.; "Bioinspired self-repairing slippery surfaces with pressure-stable omniphobicity", Research Letter, Nature, vol. 477, Sep. 22, 2011, pp. 443-447 (5 pages).
J. Lv et al.; "Bio-Inspired Strategies for Anti-Icing", Institute of Chemistry, Chinese Academy of Sciences, vol. 8, No. 4, 2014, pp. 3152-3169 (18 pages).
S.F. Ahmadi et al.; "Passive Antifrosting Surfaces Using Microscopic Ice Patterns", ACS Appl. Mater. Interfaces, 10, 2018, pp. 32874-32884 (11 pages).
K. Chibana et al.; "Continuous formation of slurry ice by cooling water—oil emulsion in a tube", International Journal of Refrigeration, 25, (2002), pp. 259-266 (8 pages).

Y. Oda et al.; "Continuous ice formation in a tube by using water-oil emulsion for dynamic-type ice-making cold thermal energy storage", International Journal of Refrigeration, 27, 2004, pp. 353-359 (7 pages).
T. Hirata et al.; "Crystal ice formation of solution and its removal phenomena at cooled horizontal solid surface Part I: ice removal phenomena", International Journal of Heat and Mass Transfer, 43, 2000, pp. 333-339 (7 pages).
T. Hirata et al.; "Crystal ice formation of solution and its removal phenomena at cooled horizontal solid surface Part II: onset of ice removal condition", International Journal of Heat and Mass Transfer, 43, 2000, pp. 757-765 (9 pages).
M.J. Kreder et al.; "Design of anti-icing surfaces: smooth, textured or slippery?", Materials, vol. 1, Jan. 2016, pp. 1-15 (15 pages).
K. Golovin et al.; "Designing durable icephobic surfaces", Science Advances, Mar. 11, 2016, pp. 1-12 (13 pages).
H. Sojoudi et al.; "Durable and scalable icephobic surfaces: similarities and distinctions from superhydrophobic surfaces", Soft Matter, vol. 12, No. 7, Feb. 21, 2016, pp. 1938-1963 (27 pages).
T. Bharathidasan et al.; "Effect of wettability and surface roughness on ice-adhesion strength of hydrophilic and super hydrophobic surfaces", Applied Surface Science, 314, 2014, pp. 241-250 (10 pages).
C. Stamatopoulos et al.; "Exceptional Anti-Icing Performance of Self-Impregnating Slippery Surfaces", ACS Applied Materials and Interfaces, 9, 2017, pp. 10233-10242 (10 pages).
P.W. Egolf et al.; "From physical properties of ice slurries to industrial ice slurry applications", International Journal of Refrigeration, 28, 2005, pp. 4-12 (9 pages).
A. Alizadeh et al.; "Hydrophobic surfaces for control and enhancement of water phase transitions", MRS Bulletin, vol. 38, May 2013, pp. 407-411 (5 pages).
H. Hong et al.; "Ice adhesion of an aqueous solution including a surfactant with stirring on cooling wall: ethylene glycol—a silane coupling agent aqueous solution", International Journal of Refrigeration, 27, 2004, pp. 985-992 (8 pages).
S.B. Subramanyam et al.; "Ice Adhesion on Lubricant-Impregnated Textured Surfaces", Langmuir, 29, 2013, pp. 13414-13418 (5 pages).
S.A. Kulinich et al.; "Ice adhesion on super-hydrophobic surfaces", Applied Surface Science, 255, 2009, pp. 8153-8157 (5 pages).
"Snow Removal and Ice Control Research", U.S. Army Cold Regions Research and Engineering Laboratory, 1970 (293 pages).
W.D. Bascom et al.; "Ice Adhesion to Hydrophilic and Hydrophobic Surfaces", The Journal of Adhesion, vol. 1, Oct. 1969, pp. 246-263 (19 pages).
D. Tsuchida et al.; "Ice formation process by cooling water-oil emulsion with stirring in a vessel", International Journal of Refrigeration, 25, 2002, pp. 250-258 (9 pages).
H.A. Stone; "Ice-Phobic Surfaces That Are Wet", ACS Nano, vol. 6, No. 8, 2012, pp. 6536-6540 (5 pages).
C. Laforte et al.; "How A Solid Coating Can Reduce The Adhesion Of Ice On A Structure", IWAIS, 2002, pp. 1-6 (6 pages).
S. Ozbay et al.; "Improved Icephobic Properties on Surfaces with a Hydrophilic Lubricating Liquid", ACS Applied Materials and Interfaces, 7, 2015, pp. 22067-22077 (11 pages).
P.W. Wilson et al.; "Inhibition of ice nucleation by slippery liquid-infused porous surfaces (SLIPS)", PCCP, RSC Publishing, 2012 (5 pages).
Tak-Sing Wong et al.; "Bioinspired Self-Repairing Slippery Surfaces with Pressure-Stable Omniphobicity", Nature 477, No. 7365 (20 pages).
K. Hayashi et al.; "Microscale Study of Ice Particles Characteristics, Role of Freezing Point Depressant, and Influence on Slurry Fluidity", NKK Engineering Research Center (18 pages).
P. Kim et al.; "Liquid-Infused Nanostructured Surfaces with Extreme Anti-Ice and Anti-Frost Performance", ACS Nano, vol. 6, No. 8, 2012, pp. 6569-6577 (9 pages).
P. Irajizad et al.; "Magnetic slippery extreme icephobic surfaces", Nature Communications, Nov. 8, 2016 (7 pages).
J. Friso van der Veen; "Melting and freezing at surfaces", Surface Sciences, 433-435, 1999, pp. 1-11 (11 pages).

(56) References Cited

OTHER PUBLICATIONS

T.M. Schutzius et al.; "Physics of Icing and Rational Design of Surfaces with Extraordinary Icephobicity", ACS Publications, Langmuir, 31, 2015, pp. 4807-4821 (15 pages).
N.D. Mulherin et al.; "Progress in Evaluating Surface Coatings for Icing Control at Corps Hydraulic Structures", U.S. Army Engineer Research and Development Center, Oct. 2003 (9 pages).
S. Liu et al.; "Experimental Study on Crystallization Process and Freezing Properties of Ice Slurry Generation Based Sodium Chloride Solution", Energy Procedia, 75, 2015, pp. 1445-1451 (7 pages).
E.J.Y. Ling et al.; "Reducing Ice Adhesion on Nonsmooth Metallic Surfaces: Wettability and Topography Effects", ACS Applied Materials and Interfaces, 8, 2016, pp. 8789-8800 (12 pages).
A.J. Meuler et al.; "Relationships between Water Wettability and Ice Adhesion", Applied Materials and Interfaces, vol. 2, No. 11, 2010, pp. 3100-3110 (11 pages).
R.N. Wenzel; "Resistance of Solid Surfaces to Wetting by Water", Industrial and Engineering Chemistry, Vo. 28, No. 8, Aug. 1936 (7 pages).
J.M. Sayward; "Seeking Low Ice Adhesion", U.S. Army Corps of Engineers Cold Regions Research and Engineering aboratory, Apr. 1979 (87 pages).
Y. Wang et al.; "Slippery liquid-infused substrates: a versatile preparation, unique anti-wetting and drag-reduction effect on water", Journal of Materials Chemistry A, 4, 2016, pp. 2524-2529 (6 pages).
P. Wang et al,; "Slippery Iquid-infused porous surfaces fabricated on aluminium as a barrier to corrosioin induced by sulfate reducing bacteria", Corrosion Science, 93, 2015, pp. 159-166 (8 pages).
L. Xiao et al.; "Slippery Liquid-Infused Porous Surfaces Showing Marine Antibiofouling Properties", ACS Applied Materials and Interfaces, 5, 2013, pp. 10074-10080 (8 pages).
B. Liu et al.; "Strategies for anti-icing: low surface energy or liquid-infused?", RSC Advances, 6, 2016, pp. 70251-70260 (10 pages).
J. Chen et al.; "Superhydrophobic surfaces cannot reduce ice adhesion", Applied Physics Letters, 101, 2012 (4 pages).
G. Salomon; "The friction and adhesion of ice", Wear, 2, 1968 (2 pages).
N. Vogel et al.; "Transparency and damage tolerance of patternable omniphobic lubricated surfaces based on inverse colloidal monolayers", Nature Communications, Jul. 2013, (10 pages).
D. Ehre et al.; "Water Freezes Differently on Positively and Negatively Charged Surfaces of Pyroelectric Materials", Science, vol. 327, Feb. 5, 2010 (5 pages).
J.P. Bedecarrats et al.; "Ice slurry production using supercooling phenomenon", International Journal of Refrigeration, 33, 2010, pp. 196-204 (9 pages).
K. Golovin er al .; "Supplementary Materials for Designing durable icephobic surfaces", Science Advances, 2, Mar. 2016 (8 pages).
International Search Report issued in corresponding International Application No. PCT/US2019/025841; dated Jul. 18, 2019 (3 pages).
Written Opinion of the International Searching Authority issued in corresponding International Application No. PCT/US2019/025841; dated Jul. 18, 2019 (9 pages).
Decision of Refusal issued in Japanese Application No. 2021-503710, dated May 9, 2023 (7 pages).

\* cited by examiner

HEAT EXCHANGE SYSTEM FOR FREEZING A PHASE CHANGE MATERIAL AND METHODS THEREOF

FIELD OF THE DISCLOSURE

One or more embodiments disclosed herein relate to the systems and methods for efficiently exchanging heat between a phase change material and a cooling fluid, and the systems and methods for an energy storage system.

BACKGROUND

Energy storage can relieve stress from the electric grid during hours of peak demand (e.g. reducing air conditioning loads). Thermal energy storage systems are commercially available, but they suffer from poor heat transfer rates due to their static nature. A thermally resistive frozen layer adheres to the heat exchanger surface during freezing, and static liquid surrounds the heat exchanger during melting. To make up for low heat transfer rates, large area heat exchangers are used, increasing the cost of the system. Commercially available ice-based thermal storage systems operate by passing a heat transfer fluid through a large bank of tubes submersed in a water bath. From this design, what is gained in simplicity is lost in efficiency, cost, and energy density. With respect to efficiency, freezing stagnant water directly on the cooling coil increases the thermal resistance to heat transfer—necessitating a large surface area for heat transfer. Large bundles of tubing, especially those constructed in copper, increase the cost of the system. Inside the storage tank, the volume occupied by tubing cannot be occupied by ice, further reducing the overall thermal energy storage density. Indeed, freezing a stagnant phase change material (PCM) is quite common across the thermal energy storage field; this technique has been used for paraffin and salt hydrate PCMs.

In addition to static freezing, a number of other techniques are common in industry for generating ice such as freezing ice on a surface by continuously running water over the outside surface. Once a satisfactory quantity of material is frozen, the surface is heated, and the ice is removed from the surface. But by reheating the material to remove it, energy is unnecessarily wasted. Such a system is disclosed in U.S. Pat. No. 8,720,211.

In other conventional systems, ice is frozen on the inside of a tubular surface, and the material is continually scraped from the surface using a mechanical scraper. But the energy required for scraping is significant, and the mechanical removal of ice causes wear-and-tear on the system.

In other conventional systems, water is placed in an open, rigid vessel and cooled from the top. Due to compressive forces generated as the water freezes from the top downward, the ice dislodges itself from the surface. The container is then inverted and the ice falls out, and the process starts over. Challenges include heat transfer limitations and inconsistent self-release.

In yet other conventional systems, an ice slurry is produced by directly contacting a brine solution with a cold light solvent bubbles. Such a system may not produce consistent ice slurry as some amount of the light solvent may dissolve in the brine solution, thereby altering the freezing temperature of the water. Such a system is disclosed in U.S. Patent Application Publication No. 2016/0273819.

SUMMARY OF THE CLAIMED EMBODIMENTS

One or more embodiments disclosed herein relate to a heat exchange system including a tank, a phase change material (PCM) held in the tank, an immiscible liquid layer held in the tank, a heat exchanger located within the immiscible liquid layer, and a distributor located above the heat exchanger. The immiscible liquid layer has a density lower than a density of the PCM and is located above the PCM. The distributor is configured to introduce a plurality of PCM droplets into the immiscible liquid layer and above the heat exchanger.

Other embodiments disclosed herein relate to an energy storage system including a tank, a phase change material (PCM) held in the tank, an immiscible liquid layer held in the tank, a heat exchanger located within the immiscible liquid layer, and a distributor located above the heat exchanger. The energy storage system further includes a heat exchanger inlet and a heat exchanger outlet, wherein the heat exchanger inlet and heat exchanger outlet provide thermal communication between the energy storage system and one or more process units during charging and discharging.

Other embodiments disclosed herein relate to an energy storage method including charging the energy storage system by freezing a liquid PCM and discharging the energy storage system by melting a frozen PCM. The energy storage method prohibits an accumulation of the frozen PCM on the heat exchanger during charging.

Other aspects and advantages will be apparent from the following description and the appended claims.

DETAILED DESCRIPTION

Figure 1:
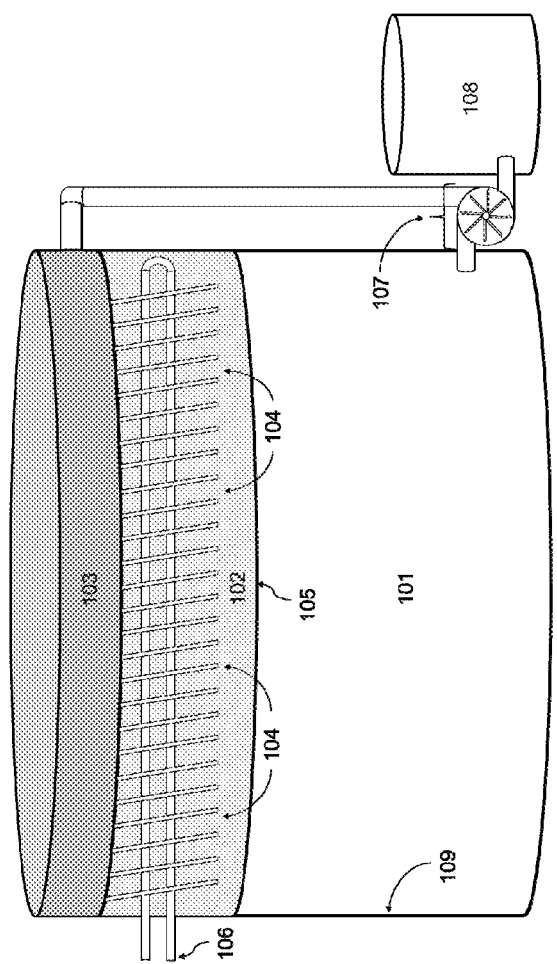
FIG. 1 is an illustration of a thermal energy storage system according to embodiments disclosed herein.

Disclosed herein is a heat exchange system and method thereof that is low cost and may increase the heat transfer efficiency and energy density of large-scale thermal energy storage. Instead of freezing stagnant PCM directly on the cooling surface, liquid PCM may be moved across the heat exchanger surface. Frozen PCM may be continuously removed by gravity forces as it forms due to the weak adhesion of the frozen material to the heat exchanger surface. The heat exchange surface may be engineered to be "icephobic", limiting the adhesion force between the PCM and the heat exchanger surface, through selection of the heat exchanger surface material and lubricating immiscible fluid. By maintaining a pristine heat transfer surface for freezing, heat exchangers can be up to ten times smaller than conventional freezing heat exchangers.

In one or more embodiments disclosed herein, the surface of the heat exchanger may be coated in a hydrophobic, or icephobic polymer material. Application of a smooth polymer surface is the simplest option for increasing the icephobicity of a base material. Due to such a coating, the thin hydrophobic liquid layer at the surface cannot support shear stress, and frozen material can be removed with flow or other forces such as gravity.

In one or more embodiments disclosed herein is a system for heat transfer. The system may include a tank, a heat exchanger, heat transfer fluid, immiscible fluid, phase change material (PCM), and a droplet distribution system. The system may allow for the storage of off-peak thermal energy for use during high-energy demand periods. In one or more embodiments, the PCM may be water or salt water. The PCM may further include one or more ice nucleating agents, such as, but not limited to, silver iodide or *Pseudonomas syringae* (or inactivated proteins extracted therefrom). The ice nucleating agents may limit, or prevent, the supercooling, hysteresis of the PCM, thereby yielding a predictable freezing point of the PCM. The PCM may also include one or more anti-biological components to provide resistance toward the growth of biologics in the system. In one or more embodiments, the PCM may be more than 50% water, such as more than 75%, 80%, 85%, 90%, 95%, 98%, or 99% water, with the remaining being one or more of a salt, an acid or base, a protein, and a nucleating agent. Further, the heat transfer fluid may be one or more glycol-based fluids, evaporative refrigerants such as R134a, or other refrigerants.

In one or more embodiments, the system may operate in charging mode by directing PCM over a heat exchanger. A cold heat transfer fluid may be passed through the heat exchanger, which thermally conducts heat away from liquid PCM droplets which are distributed onto the heat exchanger, causing the droplets to partially freeze before losing contact with the heat exchanger surface. In discharging mode, the heat exchanger conducts heat from a warm heat transfer fluid to the frozen PCM. In one or more embodiments, the discharging mode may use liquid PCM to conduct heat from one or more process units but pumping from the tank to the process unit heat exchanger and feeding the warmed liquid PCM back to the tank where it will contact the solid PCM.

The inside surface of the heat exchanger contacts a heat transfer fluid, which flows and interacts with equipment external to the heat exchange system and thermal storage system. The outside surface of the heat exchanger may be coated with a hydrophobic, or icephobic material, and may be in contact with the immiscible fluid and the PCM droplets. The immiscible fluid surrounds the heat exchanger and may occupy the volume not occupied by the PCM.

In or more embodiments, the immiscible fluid may be less dense than the liquid and solid PCM, and the solid PCM may be less dense than the liquid PCM. Accordingly, when liquid PCM, solid PCM, and immiscible fluid are present in the tank, they may form separate and distinct layers with the liquid PCM on bottom, the solid PCM in the middle, and the immiscible fluid on top. Such stratification may allow for the liquid PCM to pass through the immiscible fluid in the form of droplets, or packets of material. The PCM droplets may thermally contact the heat exchanger to exchange thermal energy between the liquid PCM and a cold heat transfer fluid in the heat exchanger. A droplet distribution system may be used during charging to distribute the liquid PCM into small droplets before entering the immiscible layer.

The heat exchanger may be located entirely within the immiscible fluid layer, while the droplet distribution system may be located above the heat exchanger and also within the immiscible fluid, or above the immiscible fluid. Such a location may allow for the liquid PCM to pass through the immiscible fluid, contact the heat exchanger, freeze, and continue traveling toward the liquid PCM layer. As the solid, or frozen, PCM is denser than the immiscible fluid, and less dense than the liquid PCM, the solid PCM may accumulate at the interface between the liquid PCM and immiscible fluid.

The heat exchange method may include two modes of operation: charging and discharging. During charging, liquid PCM is pumped from the bottom of the tank to the droplet distribution system, where the bulk material is distributed into a plurality of droplets, which are dispersed and enter into the immiscible layer in which the heat exchanger may be partially or fully immersed. Due to buoyant and gravitational forces, the liquid PCM droplets fall and may contact the heat exchanger surface which may be cooled by the cold heat transfer fluid. The droplets may freeze while in contact with the heat exchanger surface and form solid or frozen material (solid/frozen PCM) and continue to fall. The partially or fully frozen droplets fall from the heat exchanger toward the interface between the liquid PCM and immiscible fluid, accumulating around this interface. The level of this interface may be actively controlled by pumping liquid PCM from the bottom of the tank. In one or more embodiments, the liquid PCM pumped from the bottom of the tank may be fed to the droplet distribution, may be pumped a secondary storage vessel located outside the tank, or both, or may be pumped directly to the process unit or HVAC for cooling. In one or more embodiments where the liquid PCM is pumped to the secondary storage vessel, the droplet distribution system may be fed from the secondary storage vessel.

During discharging, the interface between the frozen PCM and immiscible fluid may be raised, by pumping liquid PCM from the secondary storage vessel to the bottom of the tank, so a significant portion of the frozen PCM contacts the heat exchanger surface. Simultaneously, immiscible fluid may be pumped from the tank to a secondary storage vessel. The flowing of cold heat transfer fluid in the heat exchanger may be stopped, and a warm heat transfer fluid may be fed through the heat exchanger. The warm heat transfer fluid passing through the heat exchanger may melt the PCM, thereby absorbing heat from the warm heat transfer fluid.

Further, in one or more embodiments, during charging, the interface between the liquid PCM and the immiscible fluid may be below the heat exchanger allowing enough clearance for the frozen PCM to build up. During discharging, the interface may allow for a significant quantity of the frozen PCM to contact the heat exchanger.

In one or more embodiments, during discharge, instead of bringing the frozen PCM into contact with the surface of the heat exchanger by pumping liquid PCM into the bottom of the tank, the height of the interface between the liquid PCM and immiscible fluid may fluctuate but remain relatively stable. In such embodiments, liquid PCM may continue to be fed to the distribution system and pass over the surface of the heat exchanger and come into contact with the solid PCM. As the liquid PCM in the tank is cold, at or near the freezing point, it may be sufficient to effect cooling of the warm heat transfer fluid, thereby heating the PCM. As the heated PCM continues to fall in the tank, it may contact the frozen PCM, and melt the frozen PCM. In either method, a significant portion of the cold energy storage may be contained within the frozen PCM.

In one or more embodiments, during discharge, the liquid PCM may be fed directly to an external heat exchanger or process unit, such as, but not limited to, chilled water pipes running through a building. As the liquid PCM cools the process unit, the liquid warms and is returned to the droplet distribution system to pass over the surface of the heat exchanger and come into contact with the solid PCM. The heat exchanger may or may not contain heat transfer fluid circulating inside during this mode of discharge. As the warmed PCM continues to fall in the tank, it may contact the frozen PCM, and at least partially melt the frozen PCM. A significant portion of the cold energy storage may be contained within the frozen PCM during such discharge mode.

Referring to FIG. 1, an embodiment of the thermal energy storage system is illustrated. The primary tank 109 may be thermally insulated to protect against thermal losses. The primary tank 109 may contain the heat exchanger 106 with fins 104, the PCM 101, the immiscible fluid layer 102, and the PCM droplet distribution system 103. PCM 101 may exist as a liquid, solid, or mixture of liquid and solid. For the thermal energy storage system, the PCM 101 may have a liquid density that is greater than the density of the solid PCM Immiscible liquid layer, 102 which may be located above the PCM layer 101, and form an interface 105 that seperates the PCM layer 101 and the immiscible layer 102. The immiscible layer 102 may selected such that the PCM layer 102 and the immiscble layer 102 do not mix, and the immiscible layer 102 may have a density that is lower than both the liquid and solid PCM.

The heat exchanger 106 with fins 104 may be located entirely within the immiscible layer 102 wherein lies the heat exchanger. The pitch, or spacing, between the plates may be about 1.5 to 2.5 times the predicted PCM droplet diameter, which may prevent clogging. Such a pitch may correspond to a distance of between 0.25 inches and 1 inch. The plate angle may be selected such that the PCM droplets contact the heat exchange surface without building up on the surface. A nearly vertical angle may lead to little contact and poor heat transfer. A nearly horizontal angle may result in the formation of large ice sheets. Accordingly, a plate angles between 10 and 90 degrees from horizontal, such as from 20 to 70 degrees from horizontal, or 20 to 50 degrees from horizontal, provide adequate freezing potential while allowing the droplets to proceed unimpeded through the immiscible layer 102 and into the interface 105. In one or more embodiments, the plate angle may have a lower limit of any of 10, 20, 30, 40, 50, or 60 degrees and an upper limit of any of 40, 50, 60, 70, 80, 85, or 90 degrees, where any lower limit can be used in combination with any upper limit.

The heat exchanger 106 may have a plurality of passes within the immiscible layer 102. For example, the heat exchanger may have from 1 pass (a straight line) to 100 passes within the tank, or more. Further, the length of the plates may be from 6 inches to 3 feet, such as from 8 inches to 18 inches, or such as from 10 inches to 12 inches. Further, the plates may be hollow, thereby allowing a flow path for the heat exchange fluid to travel through the plates.

As illustrated, the heat exchanger 106 is represented as a tube and fin heat exchanger, however, other heat exchanger types may be used such as coil and pillow plate exchangers. For example, instead of tube and fin heat exchangers, a plurality of coils may be used. In such embodiments, the plurality of coils may be arranged in a bank, within the immiscible layer, with between 2 and 20 layers of coils arranged on top of each other. Each layer may further include from 5 to 50 coils. The coils may be arranged such that as liquid PCM droplets contact a top coil, the droplets may partially freeze, and fall onto a lower coil. This process may be repeated through each layer of coils until the PCM is partially, or completely, frozen and the frozen PCM exits the area around the heat exchanger coils and accumulates at the interface between the liquid PCM and immiscible layer. Further, each layer of coils may be offset from adjacent layers to increase the liklihood that the PCM droplet will contact at least one coil in each layer as the droplet passes through the heat exchanger. In one or more embodiments the coils may be offset from each by 10% to 90%, such as a 25%, 33%, or 50% offset. The coils within each layer should also be spaced close enough together such that at least one coil in a lower layer is at least partially below (or overlapping) at least one coil in the layer above it.

Other embodiments may include multiple heat exchangers as opposed to a plurality of passes with one heat exchanger. Such embodiments may allow for more efficient heat transfer or lower pressure drop within the heat exchanger. The heat exchanger 106 may have heat transfer fluid flowing through it as a liquid, vapor, gas, evaporating fluid, condensing fluid, supercritical fluid, slurry, or combination thereof. The heat transfer fluid passing through the heat exchanger 106 may interact with some external device (such as a heat pump, one or more process devices, one or more external heat exchanges, cooling pipes within a structure, or HVAC system) or process to effect cooling during high energy demand period. The heat transfer fluid and/or liquid PCM may be the only material to enter or leave the thermal energy storage system during normal operation.

Still in reference to FIG. 1, the droplet distribution system 103 may provide the means by which liquid PCM droplets are generated and delivered to the immiscible liquid 102. A droplet is defined as some small packet of PCM material present in the immiscible layer. The droplet distribution system's function may be primarily to generate droplets from bulk PCM and distribute the PCM droplets across the horizontal cross-section of the primary tank, thereby providing a spatially consistent flux of droplets into the immiscible layer. The droplet distribution system 103 may be an array of spray nozzles, with a base material made of a metal such as aluminum, copper, or steel. After the liquid PCM droplets fall through a portion of the immisible fluid, they may thermally contact the heat exchanger. Thermal contact is defined herein as the PCM droplet either being very near to the heat exchanger surface or touching the heat exchanger surface.

The heat exchanger surface that is exposed to the immisible liquid may be coated with a hydrophobic, or icephobic coating. Such an icephobic coating may be a coating including but not limited to polyisobutylene (PIB, butyl rubber), paraffin, poly t-butyl methacrylate (PtBMA), polydimethylsiloxane (PDMS), polypropylene (PP), polyethylene (PE), polybutadiene, nylon 10,10, polytrifluoroethylene, poly n-butyl methacrylate (PnBMA), polyvinylidene fluoride (PVDF), or polystyrene (PS), or a fluoropolymer coating including but not limited to poly(hexafluoropropylene), polytetrafluoroethylene (PTFE), fluorinated ethylene propylene (FEP), perfluroalkoxy alkane (PFA), polychlorotrifluoroethylene (PCTFE), polytrifluoroethylene, or combinations thereof.

Further, the immiscible liquid 102 may be a material that does not substantially react with water, and is not gaseous at operating temperatures. The immiscible liquid 102 may be one or more of a poly-alpha-olefin (PAO) oil, silicone oil, a hydrocarbon mineral oil, hydrocarbon liquid, ester oil, a perfluorohydrocarbon, or other fluorinated hydrocarbon having the formula $C_nF_{2n+2}$, where n is from 2 to 10.

As liquid PCM passes over the heat exchanger plates 104, it may freeze. Liquid and solid PCM 101 exit the are around the heat exchanger 106 and continue to fall through the immiscible fluid 102. The solid PCM material accumulates around the interface 105 between the liquid PCM 101 and the immiscible liquid 102. The quantity of solid PCM that sits above and below the interface may be determined by gravitational and/or buoyant forces. The volume of immiscible fluid 102 around the heat exchanger 106 may remain clear so that the passage of frozen PCM is not blocked. In order to keep the area around the heat exchanger 106 clear, during charging, the level of the interface 105 may be actively managed so that the solid PCM present above the interface 105 does not contact the heat exchanger 106. The interface 105 may be actively managed by removing and adding material to the tank.

Pump 107 may manage all the material transfer into and out of the primary tank. Secondary storage vessel 108 may store the volume of material fed to it by pump 107. Pump 107 may remove some volume of liquid PCM 101 from the primary tank during the period of time when PCM is being frozen by the heat exchanger 106, and may add some volume of immiscible fluid 102 to the primary tank. During the period of time when frozen PCM is being melted, pump 107 may add liquid PCM 101 to the primary tank and remove at least a portion of the immiscible liquid 102. Pump 107 may also be used to deliver liquid PCM 101 to the droplet distribution system 103 during the freezing process, or deliver liquid PCM 101 to one or more external process units, HVAC, or one or more external heat exchangers.

As illustrated, pump 107 and secondary storage vessel 108 are slightly oversimplified. In a real world installation, there may be a plurality of pumps 107, a plurality of secondary storage vessels 108, piping, valves, and other equipment which one of ordinary skill in the art would find necessary to perform the functions described above.

Figure 2A:
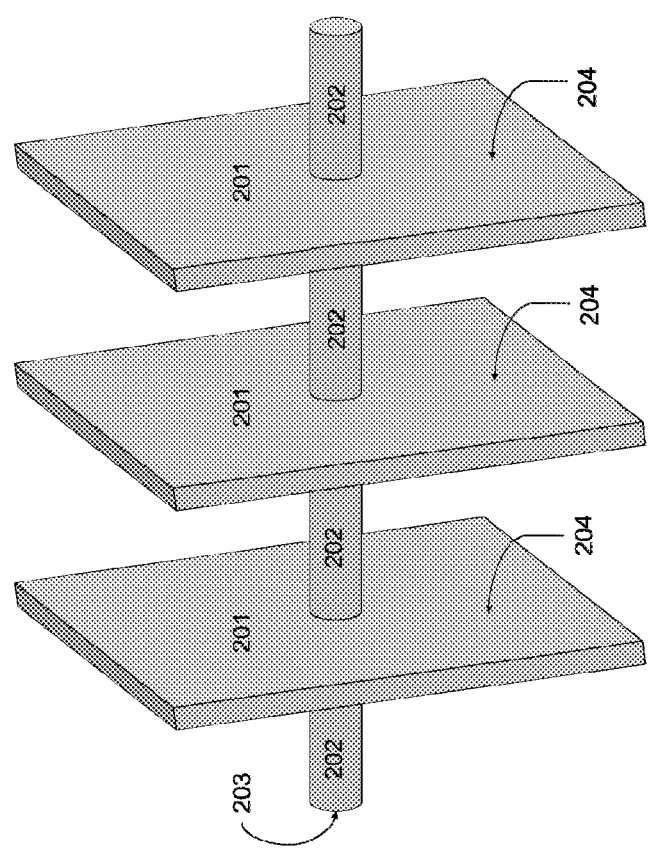
FIG. 2A is an illustration of a finned tube heat exchange assembly according to embodiments disclosed herein.

FIG. 2A illustrated one possible example of the heat exchanger according to embodiments disclosed herein. For example, a finned tube heat exchanger is illustrated.

Fins 201 may be composed of a thermally conductive material to assist in heat transfer between the PCM and the heat transfer fluid. The fin surfaces as well as the outside surface of the tube 202 may be coated by a smooth, low-surface-energy hydrophobic, or icephobic coating 204. The words tube and pipe may be used interchangeably, as well as the words icephobic and hydrophobic. The hydrophobic coating 204 may help prevent the freezing PCM from sticking to the heat exchanger surface. The hydrophobic coating may be made as thin as possible so as to minimize the thermal resistance between the heat transfer fluid and the PCM. The tube 202 may traverse through all of the fins 201, and the main function of the fins 201 may be to provide extended surface area available for heat transfer. Passing through the tube 202 may be a heat transfer fluid 203. After the heat transfer fluid 203 interacts with the heat transfer system, it may exit the system to interact with an external system, and may be recirculated back to the heat transfer system. The chilled fins 201 and tube 202 may serve to freeze PCM droplets as they slide down through the immiscible liquid due to the force of gravity and the buoyancy force. The buoyancy force may be affected by the low density of the immiscible fluid that the entire heat exchange array is submerged in.

The heat exchanger fins shown as 201 in FIG. 2A may be oriented at an angle that allows PCM to freeze, while also allowing PCM to traverse through the heat exchanger area. This angle may partially determine the speed at which the droplets freeze. The amount of time the droplet needs to be on the plate may be determined by the heat transfer coefficient of the system. Further, the amount of time a droplet is on the plate can be tuned by adjusting the velocity of the droplet. This can be achieved in a number of ways. For example, the angle of the fins, viscosity of the immiscible fluid, droplet diameter, length of the plate, pitch of the plate, and thickness of the icephobic polymer coating may all factor in determining the droplet velocity.

The heat exchanger fins 201 may also be used for melting the frozen PCM. During discharge, the interface between the liquid PCM and immiscible layer may be adjusted so that solid PCM is in contact with at least a portion of the heat exchanger surface area. By setting the heat exchanger fins at an angle, the solid PCM may more easily come into thermal contact with the heat exchanger. The frozen PCM travels vertically due to buoyant forces, but its path may be blocked by the slanted heat exchanger fins 201, thereby melting the frozen PCM and cooling a warm heat transfer fluid.

Figure 2C:
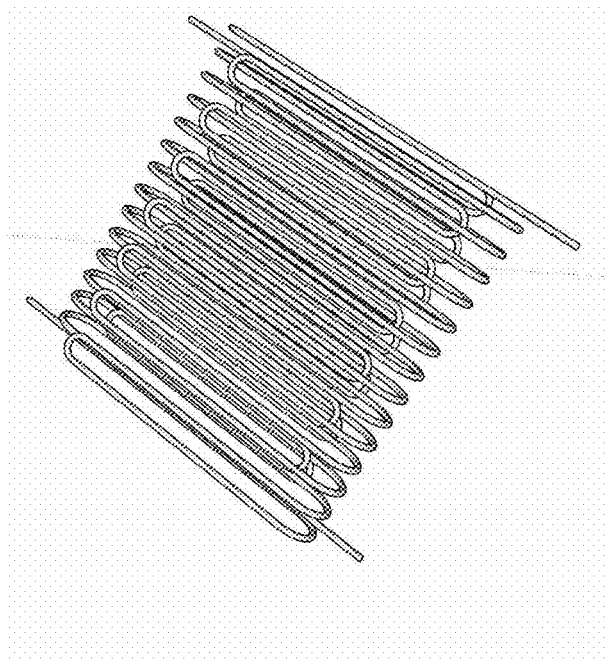
FIG. 2C is an illustration of a coil type heat exchange assembly according to embodiments disclosed herein.
Figure 2B:
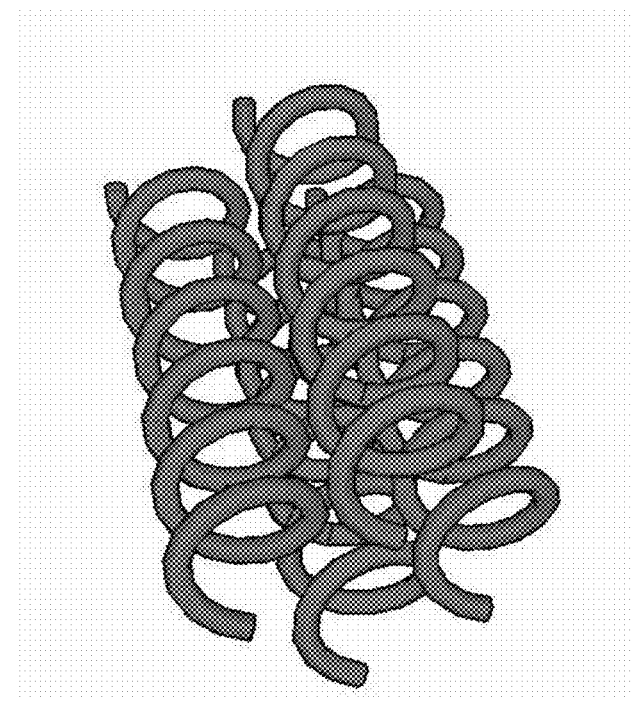
FIG. 2B is an illustration of a coil type heat exchange assembly according to embodiments disclosed herein.

FIG. 2B and FIG. 2C illustrate other possible examples of the heat exchanger according to embodiments disclosed herein. For example, FIG. 2b illustrates one possible arrangement of a coil type heat exchanger as previously described. As shown in FIG. 2B, the coils are arranged in layers with the coils within each layer spaced close enough together such that at least one coil in a lower layer is at least partially below (or overlapping) at least one coil in the layer above it. FIG. 2C illustrates another example a coil type exchanger. As shown, the coils loop back and forth in layers and at least partially overlap each other so that the surface area that the liquid PCM droplets contact may be optimized.

Figure 3:
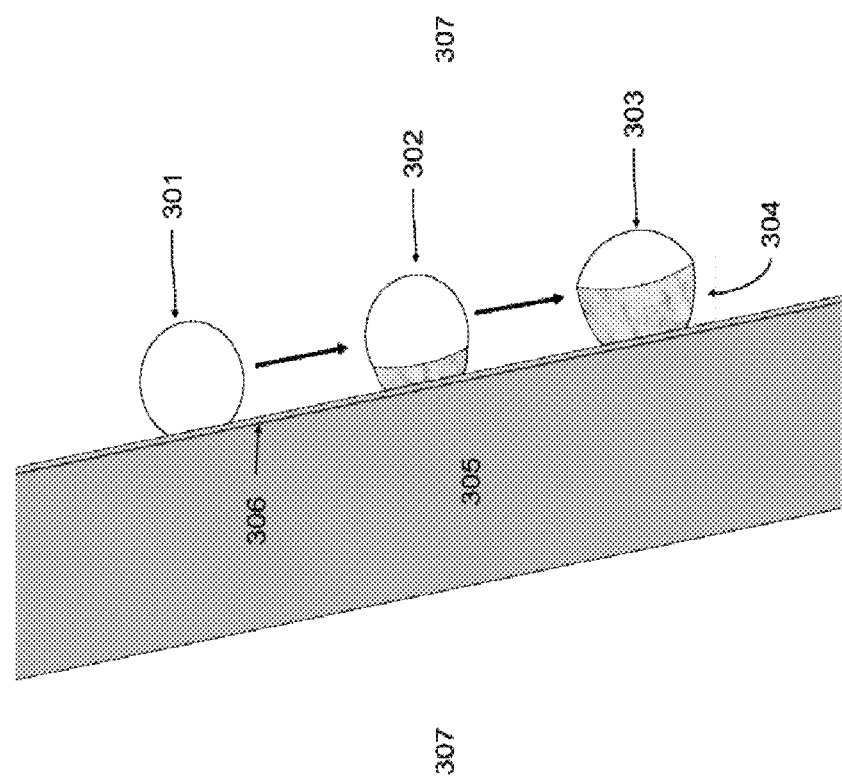
FIG. 3 is an illustration of the heat exchange method for freezing PCM according to embodiments disclosed herein.

Referring to FIG. 3, the freezing process, according to one or more embodiments herein, is illustrated. A liquid PCM droplet 301 is shown where the droplet may be entirely liquid after just beginning to thermally interact with the cooled surface 305. The droplet 301 may exhibit a high contact angle due to both the hydrophobic coating 306, and the surrounding immiscible fluid 307. The observed contact angle may be greater than the contact angle observed with the droplet on the same surface exposed to air. In some cases, when water exhibits a contact angle greater than 85° for a rough surface (and 95° for a smooth surface) in air, the surface should exhibit non-adhesion of ice when air is replaced by an immiscible oil. As the droplet continues to move down the plate (due to gravitational and buoyant forces), the temperature of the droplet may decrease until it reaches its nucleation, or freezing, temperature, the temperature at which solid PCM begins to form. Upon nucleation, a small quantity of frozen PCM may form at the interface between the droplet and the hydrophobic coating. This frozen PCM may take the form of a thin layer at the bottom of the droplet, dendrites extending into the droplet, or any other form of frozen material being formed in the droplet. This stage of the freezing process is illustrated as 302, with a partially frozen droplet.

The final stage of the freezing process is illustrated as 303, where the frozen portion of the droplet has grown as the droplet continues to travel down the plate. The droplet may be able to keep moving after nucleation due to the gravitational and buoyancy forces being greater than the adhesion force of ice. The adhesion force may be further reduced in part due to the hydrophobic coating. The hydrophobic coating used may be very smooth, which may make the ice interface smooth as well. Having two smooth surfaces may reduce the overall amount of friction experienced by the droplet, thus allowing the freezing droplet to continue traveling despite having, at least partially, changed phase.

When the partially frozen droplet reaches the end of the plate, it may fall through the remaining immiscible layer and rest upon, or above, the liquid PCM layer interface because the liquid PCM is more dense than the solid PCM. The solid portion 304 of the PCM droplet may then remain at the interface between the liquid PCM and immiscible fluid.

In this process, the droplets may not completely freeze before exiting the plate. Any remaining liquid on the droplet may fall with the frozen portion of the droplet and reach layer of solid PCM between the liquid PCM and immiscible fluid. Due to the density difference between the liquid PCM and solid PCM, after the droplet falls the remaining liquid portion may wick down the accumulated solid PCM and rejoin the bulk liquid PCM where it can be pumped back to the droplet distribution system and recycled.

According to one or more embodiments herein, the heat transfer fluid temperature may be between 25° C. and −25° C. Due to the salt, nucleating agents, or anti-biologic agents present in the PCM, the freezing point of the liquid PCM may be substantially similar to the heat transfer fluid temperature, i.e., between 25° C. and −25° C. In some embodiments, the freezing point of the liquid PCM may between 10° C. and −10° C.

Depending on the system or process equipment that the above described thermal energy storage system is cooling, the heat transfer fluids may be different depending on the application and desired cooling temperature. However, in many cases the heat transfer fluid may be one or more a glycol-based coolant. In other embodiments, the heat transfer fluid may be a refrigerant selected based on a liquid-gas transitioning temperature.

One or more embodiments herein are directed toward heat exchange systems and methods for exchanging heat between a heat transfer fluid and a phase change material (PCM). The system and method include a tank which may hold a liquid PCM, an immiscible fluid layer above the liquid and solid PCM, a heat exchanger within the immiscible layer, and a fluid distribution system above the heat exchanger and above, or within, the immiscible layer.

The fluid distribution system may feed a plurality of liquid PCM droplets into the tank proximate the top of the tank, where the liquid PCM droplets may fall, due to gravity, and contact a surface of the heat exchanger where the liquid PCM droplets may freeze, producing a solid PCM. During charging, the liquid PCM droplets may be fed to the tank at near freezing conditions as a liquid.

The solid PCM may then accumulate at the interface between the liquid PCM and the immiscible fluid layer. During freezing, an icephobic polymer coating and/or the geometry of the heat exchange may prohibit accumulation of the solid PCM on the surface of the heat exchanger.

In one or more embodiments, the liquid PCM fed to the tank from the fluid distribution system may be pumped from the liquid PCM in the tank, may be pumped from a secondary storage vessel external to the tank, or both, or may be pumped from one or more external process units, HVAC, or external heat exchanger after cooling. Further, by pumping liquid PCM between the tank and the secondary storage vessel, the height between the top of the accumulated solid PCM and the bottom of the heat exchanger may remain fixed.

The energy storage system and method, as described above, may operate under a regular charging and discharging cycle.

Figure 4A:
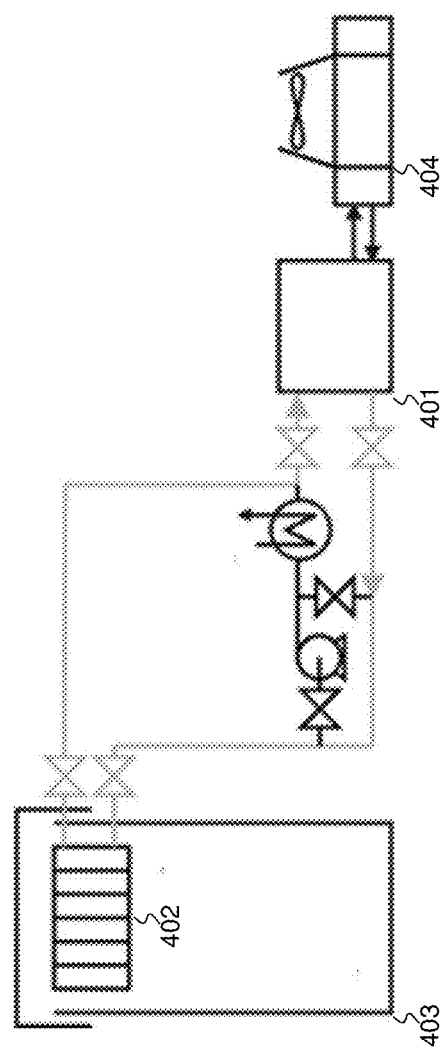
FIG. 4A is an illustration of the energy storage charging method according to embodiments disclosed herein.

As illustrated in FIG. 4A, during charging, liquid PCM may be frozen within the tank 403 by thermal contact with a cool heat transfer fluid being pumped from an external chiller 401 to heat exchanger 402. In one or more embodiments, charging the system may be accomplished by pumping liquid phase PCM from a bottom of the tank to the top of the tank where it is dispersed as droplets by the fluid distribution system (as described with respect to FIG. 1). The liquid PCM droplets may then contact the cool surface of the heat exchanger 402 and freeze, thereby producing frozen PCM. The frozen PCM may then accumulate at the interface between the liquid phase PCM and the immiscible liquid layer (not illustrated) within tank 403. Waste heat generated by external chiller 401 may be rejected to the atmosphere by cooling tower 404.

Figure 4B:
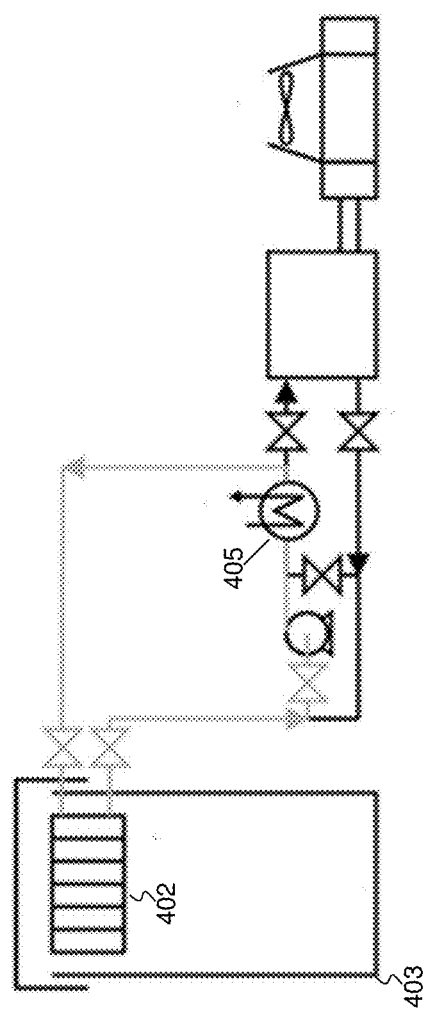
FIG. 4B is an illustration of the energy storage discharging method according to embodiments disclosed herein.

As illustrated in FIG. 4B, during discharge, solid PCM may be brought into contact with heat exchanger 402 (as described with respect to FIG. 1), and melted within the system by thermal contact with a warm heat transfer fluid being pumped through an external heat exchanger 405, thereby lower the temperature of the warm heat transfer fluid, and cooling one or more external process units (not illustrated) which may be connected to external device 405, such as a heat exchanger. The thermal contact may be accomplished by removing at least a portion of the immiscible fluid layer from the tank to a secondary storage vessel (FIG. 1), and/or adding liquid PCM from the secondary vessel to the tank, thereby bringing the frozen PCM into contact with the heat exchanger. The cool heat transfer fluid used to freeze the PCM is stopped from circulating and a warm heat transfer fluid is pumped through the heat exchanger 402 and external heat exchanger 405. The frozen PCM melts and lowers the temperature of the warm heat transfer fluid. This cooled heat transfer fluid may then be routed to one or more process units, heat pump, cooling tubes, or HVAC systems for use as a cooling medium during periods of high energy demand.

Figure 5:
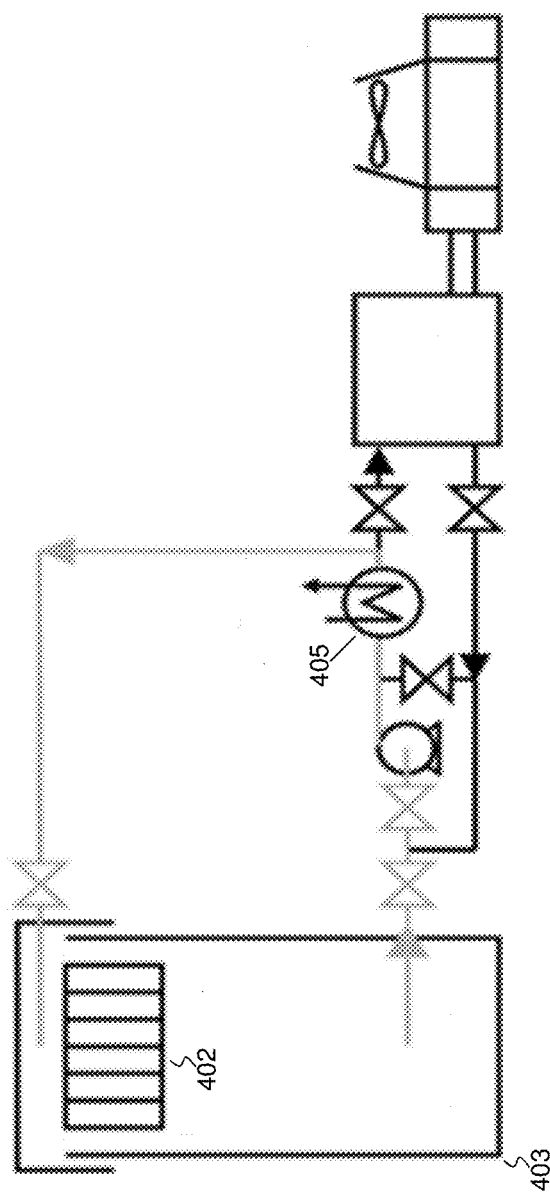
FIG. 5 is an illustration of the energy storage discharging method according to embodiments disclosed herein.

Alternatively, instead of bringing the frozen PCM into contact with heat exchanger having a warm heat transfer fluid to affect cooling, cold, liquid PCM may be pumped from the bottom of the tank 403 and fed through an external heat exchanger 405, as illustrated in FIG. 5. This cold liquid PCM will increase in temperature as it comes into thermal contact with a warm heat transfer fluid in the external heat exchanger 405. The warmed liquid PCM may then be fed back to the tank 403 through the fluid distribution system where it will come into contact with the solid PCM and melt at least a portion of the solid PCM.

While not illustrated, another method of discharge may be accomplished by pumping cold, liquid PCM from the bottom of the tank 403 to the droplet distribution system. The liquid PCM droplets may then pass over the surface of the heat exchanger 402, containing a warm heat transfer fluid, and come into contact with the solid PCM. As the liquid PCM in the tank is cold, at or near the freezing point, it may be sufficient to effect cooling of the warm heat transfer fluid within the heat exchanger, thereby also heating the PCM, and at least partially melting the solid PCM. In such an embodiment, the height of the interface between the liquid PCM and immiscible fluid may fluctuate but remain relatively stable, and the solid PCM may not come into direct contact with the heat exchanger. The cooled heat transfer fluid may then be routed to one or more process units or HVAC systems for use as a cooling medium during periods of high energy demand.

In any embodiment, a majority of the stored cooling capacity of the energy storage system may be derived from the frozen PCM located at the interface between the liquid PCM and immiscible fluid. Further, during charging, as the liquid PCM is fed to the tank at near freezing conditions, the bulk liquid PCM layer may also be at, or near the freezing temperature of the PCM, thereby further increasing the energy storage of the overall system.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A heat exchange system comprising:
   a tank;
   a phase change material (PCM) held in the tank;
   an immiscible liquid layer held in the tank, wherein the immiscible liquid layer has a density lower than a density of the PCM and is located above the PCM;
   a heat exchanger coated with an icephobic polymer coating, the heat exchanger located within the immiscible liquid layer and in contact with the PCM configured to freeze at least a portion of the PCM;
   a distributor located above the heat exchanger configured to introduce a plurality of PCM droplets into the immiscible liquid layer and above the heat exchanger; and
   one or more secondary storage vessels containing liquid PCM and located externally to the tank, the one or more secondary storage vessels configured to add the liquid PCM to the tank, thereby bringing frozen PCM into contact with the heat exchanger, and
   wherein the heat exchanger is further configured to receive a warm heat transfer fluid pumped through the heat exchanger to melt the frozen PCM, thereby lowering a temperature of the warm heat transfer fluid.

2. The system of claim 1, wherein the icephobic polymer coating is selected from the group consisting of poly(hexafluoropropylene), polytetrafluoroethylene (PTFE), fluorinated ethylene propylene (FEP), perfluoroalkoxy alkane (PFA), polychlorotrifluoroethylene (PCTFE), polytrifluoroethylene, or combinations thereof.

3. The system of claim 1, wherein the PCM is water and optionally includes one or more of an ice nucleating agent or a salt.

4. The system of claim 3, wherein the PCM has a freezing point between −10° C. and 10° C.

5. The system of claim 1, wherein the distributor is a spray nozzle.

6. The system of claim 1, wherein the heat exchanger is a plate-based heat exchanger.

7. The system of claim 6, wherein the heat exchanger further comprises:
   a plurality of tube passes; and
   one or more plates comprising:
      a plate angle of 45° to 90° from horizontal.

8. An energy storage system comprising the heat exchange system of claim 1, the energy storage system further comprising:
   a heat exchanger inlet and a heat exchanger outlet, wherein the heat exchanger inlet and heat exchanger outlet provide thermal communication between the energy storage system and one or more process units during charging and discharging.

9. The energy storage system of claim 8, further comprising one or more pumps for transferring PCM, immiscible fluid, or both, between the tank and the one or more secondary storage vessels, or an external device.

10. An energy storage method using the system of claim 1, the method comprising:
    charging the system by freezing the liquid PCM; and
    discharging the system by melting the frozen PCM,
    wherein the energy storage method prohibits an accumulation of the frozen PCM on the heat exchanger during charging.

11. The method of claim 10, wherein charging comprising:
    pumping liquid phase PCM from a bottom of the tank to a top of the tank;
    contacting the liquid phase PCM with the heat exchanger;
    freezing the liquid phase PCM in contact with the heat changer using a cold heat transfer fluid, producing the frozen PCM;
    accumulating the frozen PCM below the heat exchanger at an interface between the liquid phase PCM and the immiscible liquid layer.

12. The method of claim 10, further comprising removing at least a portion of the immiscible fluid layer from the tank to the secondary storage vessel.

13. The system of claim 1, wherein the distributor is configured to introduce the plurality of PCM droplets and let the plurality of liquid PCM droplets thermally contact the heat exchanger.

14. The system of claim 13, wherein the heat exchanger is configured to at least partially freeze the plurality of PCM droplets before losing contact with the heat exchanger surface, and the icephobic polymer coating with the immiscible liquid layer prevents accumulation of at least partially frozen PCM on the heat exchanger surface.

15. The system of claim 13, wherein upon thermally contacting the heat exchanger, the plurality of PCM droplets are at least partially frozen, forming at least partially frozen droplets which fall from the heat exchanger toward an interface between the liquid PCM and the immiscible fluid.

16. A heat exchange method for exchanging heat between a heat transfer fluid and a phase change material (PCM), the method comprising:
    holding an immiscible fluid layer in a tank;
    feeding a plurality of liquid PCM droplets into the tank proximate a top of the tank;
    contacting the plurality of liquid PCM droplets on a heat exchanger and freezing the liquid PCM, producing a solid PCM;
    prohibiting accumulation of the solid PCM on a surface of the heat exchanger via an icephobic polymer coating on the surface of the heat exchanger and the immiscible fluid layer;
    accumulating the solid PCM in the tank;
    adding liquid PCM from a secondary storage vessel to the tank, thereby bringing the frozen PCM into contact with the heat exchanger;
    pumping a warm heat transfer fluid through the heat exchanger;
    melting the frozen PCM; and
    lowering a temperature of the warm heat transfer fluid.

17. The method of claim 16, further comprising pumping liquid PCM from the tank and using said pumped liquid PCM as the plurality of liquid PCM droplets in the feeding step.

* * * * *